Patented Jan. 13, 1953

2,625,559

UNITED STATES PATENT OFFICE 2,625,559

PREPARATION OF METHYL TIN CHLORIDES

Frederick A. Smith, Kenmore, N. Y., assignor, by mesne assignments, to Union Carbide and Carbon Corporation, a corporation of New York No Drawing. Application February 4, 1949, Serial No. 74,721

4 Claims. (Cl. 260—429)

This invention relates to the preparation of methyl tin chlorides.

In accordance with the present invention methyl tin chlorides are prepared by reacting methyl chloride ($CH_3Cl$) with tin, desirably at a temperature between 300° and 500° C. The reaction may be carried out in the presence or absence of a metallic catalyst; and the tin can be used as such, or in the form of alloys with other metals.

Prior to my invention methyl tin chlorides were prepared commercially by the reaction of a Grignard reagent with tin tetrachloride, which was less economical and less convenient. Also, the Grignard reaction produces poisonous side products whereas no such products are formed in my improved method.

In one specific embodiment of my novel method the methyl chloride is bubbled as a vapor through a pool of molten tin or tin alloy in a vertical reaction tube while heating the reaction tube to a temperature high enough to effect the reaction.

In another embodiment a fluidized column of powdered tin or tin alloy is heated to reaction temperature and methyl chloride vapor is passed through the column in intimate contact with the fluidized powder.

In both embodiments the conversion can be increased and the temperature of reaction lowered by employing copper as a catalyst, either alone or as an alloy with tin or other metal.

The following examples of specific reactions are given to aid in understanding the invention.

Example 1

A pool of molten tin was maintained at a temperature of 450° C. in a vertical reaction tube 22 inches long and 1 inch in diameter by heating the tube in a furnace. Methyl chloride vapor was passed into the bottom of the column of molten tin by a pipe inserted through the top of the reaction tube. The exit gases were passed through an air condenser which collected the tin compounds. It was found that a mol efficiency of 75% to dimethyl tin chloride —$(CH_3)_2SnCl_2$ and of 19.5% to methyl tin chloride —$(CH_3)SnCl_3$, was obtained. The mol per cent conversion of methyl chloride to methyl tin chlorides was 10%.

Example 2

Under conditions similar to Example 1, but using a packing of speculum metal ($Cu_3Sn$) immersed in the pool of molten tin in the reaction tube, an increased mol per cent conversion to methyl tin chlorides of 36% was obtained. It was possible to initiate the reaction at a temperature as low as 350° C.

Example 3

A pool of molten tin containing 5% copper dissolved in the tin as a catalyst was held at a temperature of 400° C. in the reaction tube and methyl chloride vapor was passed therethrough at a rate of 200 milliliters per minute. Dimethyl tin chloride —$(CH_3)_2SnCl_2$, was obtained as a product. Without the copper, the reaction did not proceed at 400° C.

Example 4

A column of fluidized powdered speculum metal ($Cu_3Sn$) was maintained in a reaction tube held at a temperature of 300° C. by passing methyl chloride vapor up through the tube. The effluent gases were found to contain a substantial quantity of methyl tin chloride and dimethyl tin chloride. The per cent conversion of methyl chloride to methyl tin chlorides was 17.5%; the efficiency based on methyl chloride was 55%.

What is claimed is:

1. A method of preparing methyl tin chlorides which comprises reacting methyl chloride with tin at a temperature between 300° and 500° C. in the presence of copper as a catalyst.

2. A method of preparing methyl tin chlorides which comprises reacting methyl chloride with tin in the presence of copper as a catalyst.

3. A method of preparing methyl tin chlorides which comprises reacting methyl chloride with a copper-tin alloy.

4. A method of preparing methyl tin chlorides which comprises reacting methyl chloride in the vapor state with a copper-tin alloy powder.

FREDERICK A. SMITH.

REFERENCES CITED

The following references are of record in the file of this patent:

UNITED STATES PATENTS

| Number | Name | Date |
|---|---|---|
| 1,639,947 | Kraus | Aug. 23, 1927 |
| 2,444,270 | Rochow | June 29, 1948 |

OTHER REFERENCES

Goddard: Text Book of Inorganic Chemistry, vol. XI, part I, page 308, London (1928).

Krause: Die Chem. der Metall, Organischen Verbindungen, page 339, (1937) Berlin.